(12) United States Patent
Phillips et al.

(10) Patent No.: US 8,346,822 B2
(45) Date of Patent: Jan. 1, 2013

(54) MEMORY MANAGEMENT

(75) Inventors: Anthony H. Phillips, Southampton (GB); Andrew D. Wharmby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/274,178

(22) Filed: Nov. 19, 2008

(65) Prior Publication Data

US 2009/0144349 A1  Jun. 4, 2009

(30) Foreign Application Priority Data

Nov. 29, 2007  (EP) ..................................... 07121859

(51) Int. Cl.
  *G06F 17/30* (2006.01)
  *G06F 7/00* (2006.01)
(52) U.S. Cl. ........................................ 707/814; 707/758
(58) Field of Classification Search .................. 707/814, 707/758
  See application file for complete search history.

(56) References Cited

U.S. PATENT DOCUMENTS

| 7,612,781 B2 * | 11/2009 | Washizu et al. ............... 345/543 |
| 2006/0101439 A1 * | 5/2006 | Massarenti et al. ............ 717/148 |

FOREIGN PATENT DOCUMENTS

| JP | 61-279955 | 12/1986 |
| JP | 11-338761 | 12/1999 |
| WO | 99/64955 A1 | 12/1999 |

OTHER PUBLICATIONS

McGachey et al., Reducing Generational Copy Reserve Overhead with Fallback Compaction, 2006 ACM, pp. 17-28.*

* cited by examiner

*Primary Examiner* — Kuen Lu
(74) *Attorney, Agent, or Firm* — Steven M. Greenberg, Esq.; Carey, Rodriguez, Greenberg & O'Keefe

(57) ABSTRACT

A method of memory management for a software application in execution in a computer system, the method comprising the steps of:
  a memory manager supplying a first unit of memory having a predetermined size as a first allocation space for the software application;
  the software application storing data in the first allocation space;
  and discarding inactive data in the first allocation space by the steps of:
  a) the memory manager supplying a second unit of memory for the software application;
  b) identifying active data in the first allocation space and copying said active data to the second unit of memory, the active data including at least data that is in use by the software application;
  c) indicating, in the first allocation space, that the active data has become inactive;
  d) mapping a portion of the first allocation space to be logically contiguous with the second unit of memory to define a second allocation space for the software application whereby the second allocation space has a size that is equivalent to the predetermined size; and
  e) returning a remaining portion of the first allocation to the memory manager as a unit of memory suitable for reuse.

9 Claims, 7 Drawing Sheets

MEMORY MANAGEMENT

CROSS-REFERENCE TO RELATED APPLICATIONS

This application claims priority under 35 U.S.C. §119(a) to European Patent Application Serial Number 07121859.8 filed Nov. 29, 2007 entitled "MEMORY MANAGEMENT," the entirety of which is incorporated herein by reference.

FIELD OF THE INVENTION

The present invention relates to memory management for a software application in execution. In particular, it relates to survivor memory in a garbage collection process.

BACKGROUND OF THE INVENTION

Memory management in runtime environments is often devised so as to provide convenience for the software engineer. For this reason, runtime environments such as Java (Java is a Registered Trademark of Sun Microsystems Inc.) include heap memory having a garbage collector. A garbage collector is a runtime facility for automatically identifying and discarding inactive data from memory, such as objects, in order to free-up storage. Garbage collection is a luxury afforded by the efficiencies of modern computer systems that serves to liberate software engineers from the task of programmatically discarding each and every inactive object.

Modern garbage collection algorithms make use of the weak generational hypothesis that most allocated objects will be "short lived" (i.e. objects will be discardable a relatively short time after they are created). To make use of this hypothesis, the objects are allocated in a section of a memory heap called a "nursery". The nursery is garbage collected much more frequently than the main heap where older (tenured) objects are stored and typically consists of two areas known as the allocate space and the survivor space. As the objects are copied into contiguous memory the nursery is automatically compacted. A Copying garbage collection algorithm copies live objects from the nursery allocation space into a survivor memory performing compaction at the same time. survivor memory is a portion of the nursery heap of configurable size. For example, the survivor memory may constitute up to 50% of the total memory allocated to the nursery.

FIG. 1a is a schematic diagram of software applications 202 in execution in a computer system. Each of the software applications has associated heap memory 206 supplied by a memory manager 204. The heap memory 206 occupies an address range that can be a physical address range or a logical address range into which physical memory is mapped by the memory manager 204. For example, the heap memory 206 is a nursery heap as part of a larger application heap. The memory manager 204 is operable to supply units of memory of the computer system to software applications 202. For example, the memory manager 204 is a component of an operating system in the computer system, such as a kernel memory manager.

A part 208 of the heap 206 is a dedicated survivor memory for use during a garbage collection process. The survivor memory part 208 is characterised in that it is not available for the allocation of objects by the application 202 and it is reserved for use during a garbage collection process. FIG. 1b is a schematic diagram of the heap 206 of a software application 202 of FIG. 1a. In execution the software application 202 stores and retrieves data in the heap 206. The heap 206 includes allocated parts (hatched and shaded) corresponding to stored data. Such data can include, for example, allocated software objects, data structures, records, fields or variables. A garbage collection algorithm is operable to periodically process the heap 206 to discard unused data items allocated in the heap 206. Such an algorithm includes a Copying garbage collection algorithm. In processing the heap 206, the garbage collection algorithm identifies data items in the heap 206 that are active. An active data item is a data item that is in use by the software application 202. In contrast, a data item that is not active is no longer required by the software application 202. For example, an active data item is referenced by the software application 202, such as by a memory pointer or object reference. The garbage collection algorithm copies such identified active data items to the survivor memory 208. The garbage collection algorithm can copy the identified active data items to contiguous locations in the survivor memory 208 in order to compact the data items. Subsequently, only data items recorded in the survivor memory 208 need be retained (hence "survivor") and all other data items in the heap 206 (corresponding to data items that are not active) can be discarded.

One problem with such Copying garbage collectors is that each application maintains its own survivor memory even if it is not currently performing a garbage collection. This problem is particularly acute in systems having a large number of software applications in execution and a correspondingly large amount of memory allocated as survivor memory. Also, since survivor memory is reserved for use during the garbage collection process, it is not available for the storage of data by the software applications 202.

It would therefore be advantageous to provide for the benefits of garbage collection with survivor memory for copying garbage collectors without a need to dedicate heap memory as survivor memory for each software application in execution.

SUMMARY OF THE INVENTION

The present invention accordingly provides, in a first aspect, a method of memory management for a software application in execution in a computer system, the method comprising the steps of: a memory manager supplying a first unit of memory having a predetermined size as a first allocation space for the software application; the software application storing data in the first allocation space; and discarding inactive data in the first allocation space by the steps of:
 a) the memory manager supplying a second unit of memory for the software application;
 b) identifying active data in the first allocation space and copying said active data to the second unit of memory, the active data including at least data that is in use by the software application;
 c) indicating, in the first allocation space, that the active data has become inactive;
 d) mapping a portion of the first allocation space to be logically contiguous with the second unit of memory to define a second allocation space for the software application whereby the second allocation space has a size that is equivalent to the predetermined size; and
 e) returning a remaining portion of the first allocation to the memory manager as a unit of memory suitable for reuse.

Preferably the second unit of memory is characterised by being of a size that is at least the same as an aggregated size of the active data in the first allocation space.

Preferably the memory manager is a kernel memory manager in an operating system of the computer system.

Preferably at least the step b) is conducted by a garbage collector software routine.

Thus, in this way the second unit of memory is available to the software application in execution as survivor memory for the purpose of garbage collection and memory is released by the software application on completion of garbage collection. Accordingly, survivor memory is not consumed by software applications except during a garbage collection process so avoiding the need to dedicate heap memory as survivor memory for each software application in execution.

The present invention accordingly provides, in a second aspect, an apparatus for managing memory for a software application in execution in a computer system, the apparatus comprising:
  a memory manager for supplying a first unit of memory having a predetermined size as a first allocation space for the software application;
  a storer for the software application to store data in the first allocation space;
  and a discarder for discarding inactive data in the first allocation space by the steps of:
    a) a supplier for the memory manager to supply a second unit of memory for the software application;
    b) an identifier for identifying active data in the first allocation space and copying said active data to the second unit of memory, the active data including at least data that is in use by the software application;
    c) an indicator for indicating, in the first allocation space, that the active data has become inactive;
    d) a mapper for mapping a portion of the first allocation space to be logically contiguous with the second unit of memory to define a second allocation space for the software application whereby the second allocation space has a size that is equivalent to the predetermined size; and
    e) a memory deallocator for returning a remaining portion of the first allocation to the memory manager as a unit of memory suitable for reuse.

The present invention accordingly provides, in a third aspect, an apparatus comprising:
  a central processing unit;
  a memory subsystem;
  an input/output subsystem;
  and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENTS

Figure 2:
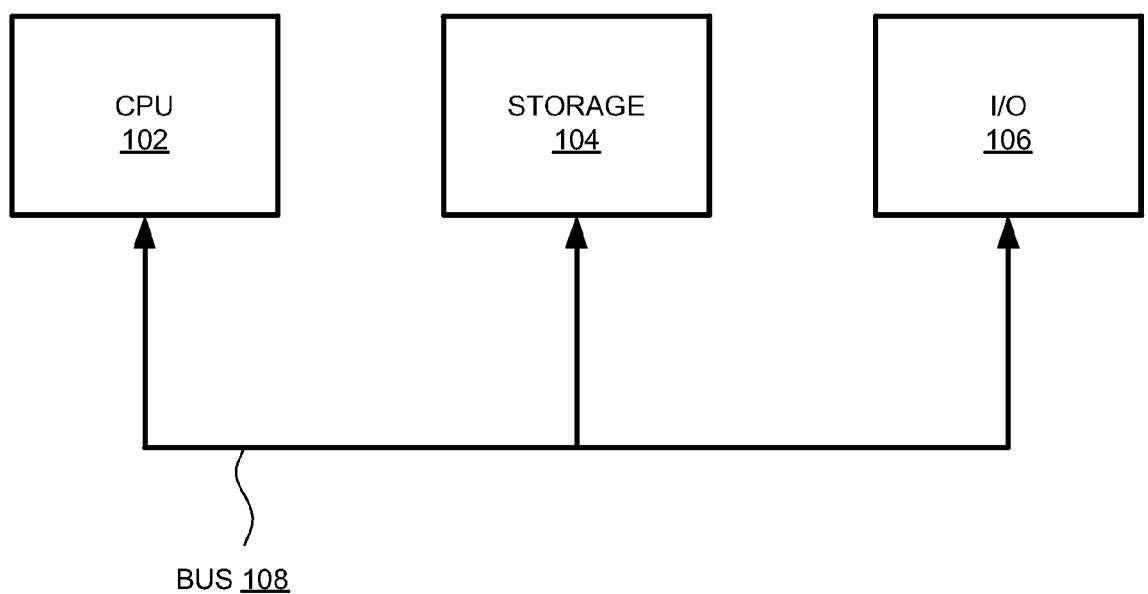
FIG. 2 is a block diagram of a computer system suitable for the operation of embodiments of the present invention.

FIG. 2 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 1A:
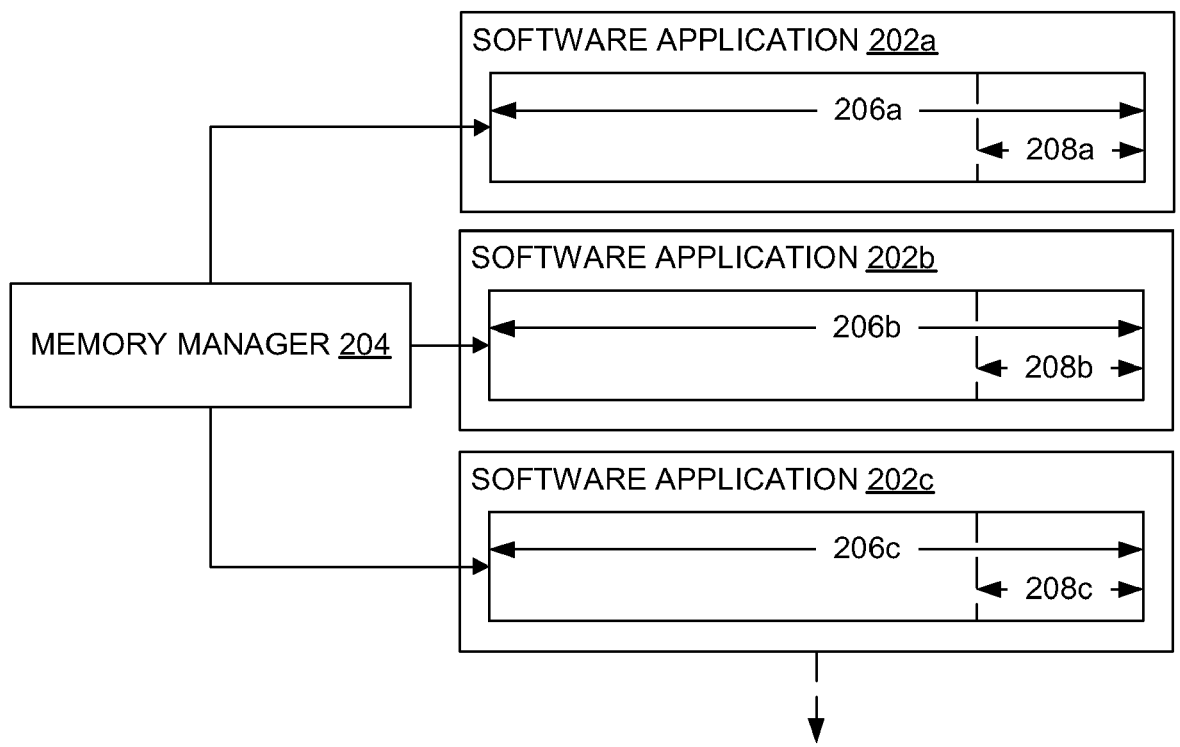
FIG. 1a is a schematic diagram of software applications in execution in a computer system in the prior art.
Figure 1B:
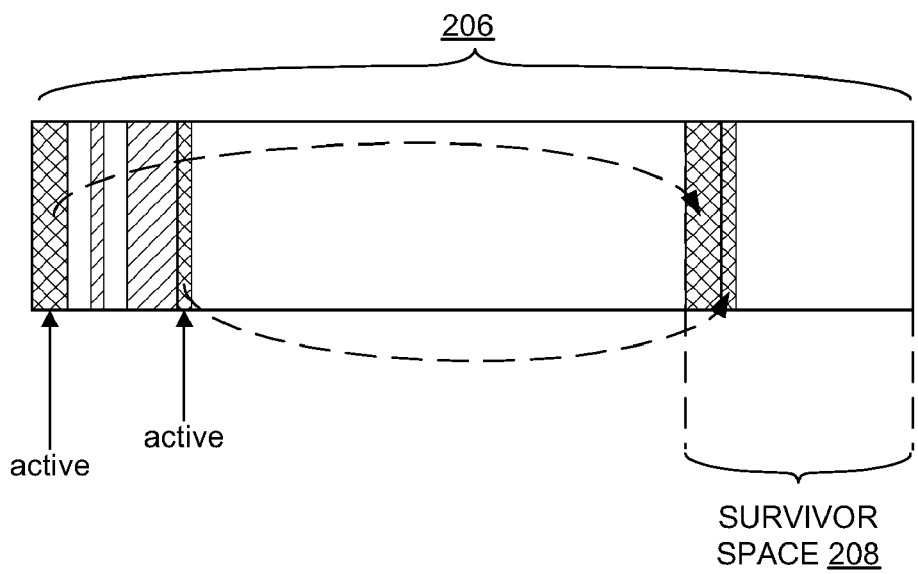
FIG. 1b is a schematic diagram of the heap of a software application of FIG. 1a in the prior art.
Figure 3A:
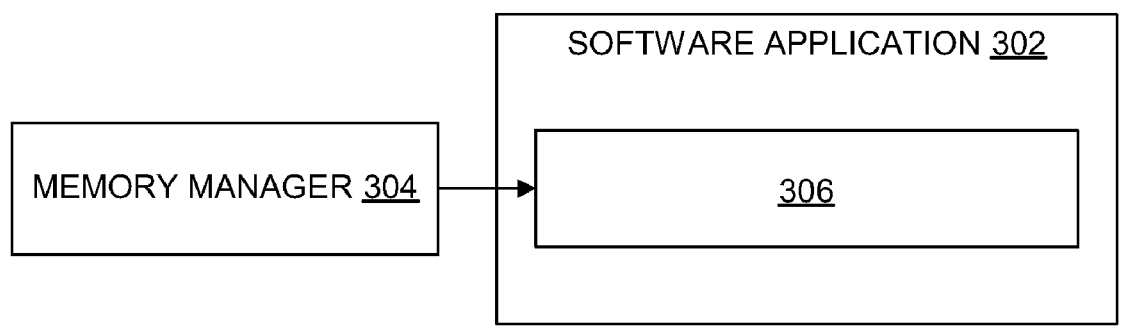
FIG. 3a is a schematic diagram of a software application in execution in a computer system in accordance with a preferred embodiment of the present invention.

FIG. 3a is a schematic diagram of a software application 302 in execution in a computer system in accordance with a preferred embodiment of the present invention. Many of the elements of FIG. 3a are identical to those described above with respect to FIG. 1a and these will not be repeated here. In contrast to the arrangement of FIG. 1a the software application 302 of FIG. 3a includes a heap memory 306, such as a nursery heap, that is entirely available to the software application for the storage of data. No part of heap 306 is reserved as survivor memory. The heap 306 is supplied to the software application 302 by the memory manager 304. Thus, in the arrangement of FIG. 3a the memory footprint of the software application 302 is limited to only that required as an application heap for the storage of application data.

In use, the memory manager 304 is operable to supply a second unit of memory to the software application 302 in response to the initiation of a garbage collection process in the software application 302. The second unit of memory is suitable for use as a survivor memory during a garbage collection process. Such a garbage collection process identifies and copies active data in the heap 306 to the second unit of memory for preservation. Such copying can include copying to contiguous memory locations in the second unit of memory to compact the active data. On completion of the copying process of the garbage collector, a part of heap memory 306 is released by the software application 302 such that it is available to the memory manager 304 as a unit of memory for reuse. The released part of the heap memory 306 has a size that corresponds to a size of the second unit of memory. Thus survivor memory is available to the software application 302 in the form of the second unit of memory when required by a garbage collection process. Further, memory is released by the software application on completion of the garbage collection process. In this way survivor memory is available to the software application 302 in execution for the purpose of garbage collection and memory is released by the software application on completion of garbage collection. Accordingly, survivor memory is not consumed by software applications except during a garbage collection process so avoiding the need to dedicate heap memory as survivor memory for each software application in execution.

Figure 3B:
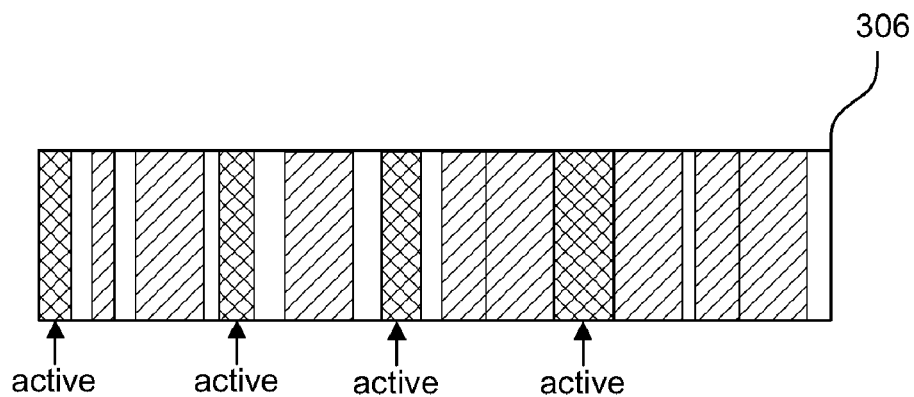
FIGS. 3b to 3d are schematic diagrams of the heap of FIG. 3a during a garbage collection process in accordance with a preferred embodiment of the present invention.
Figure 3C:
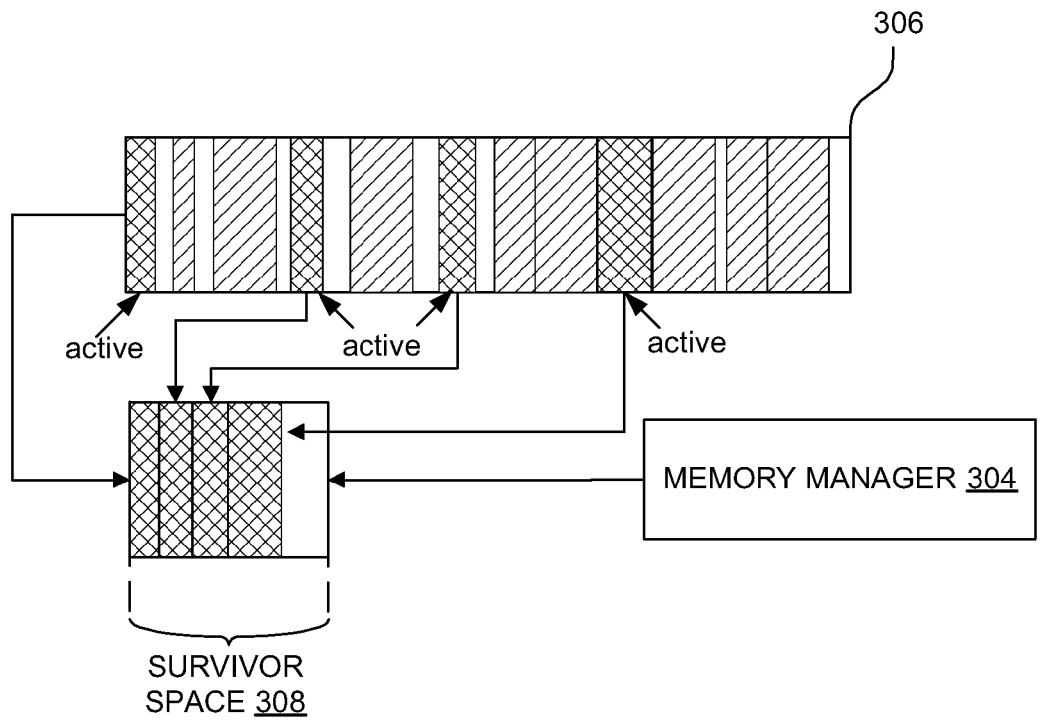
Figure 3D:
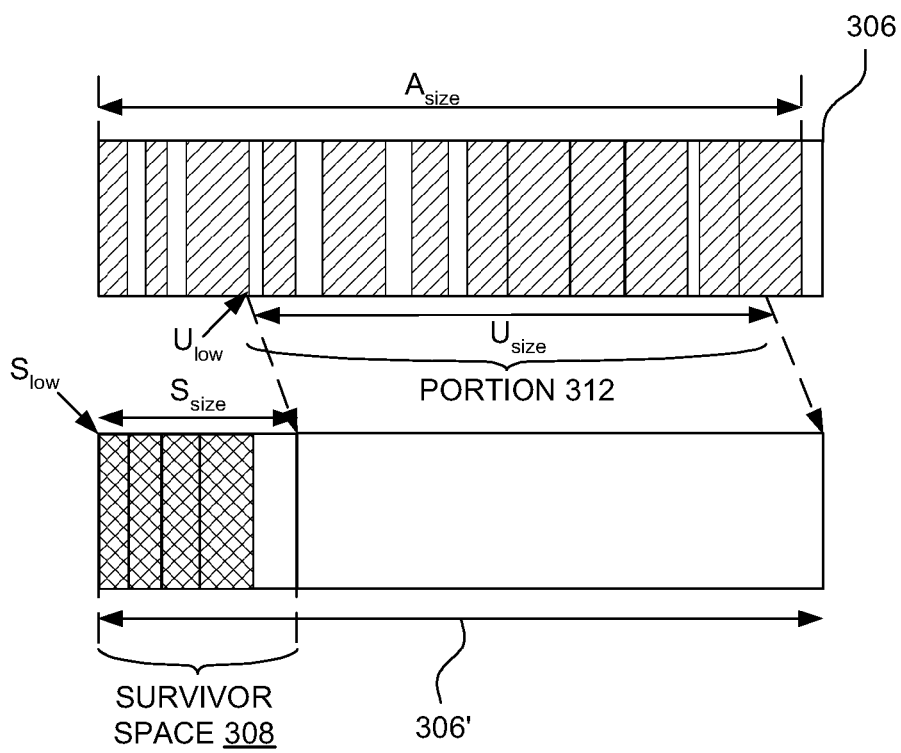

FIGS. 3b to 3d are schematic diagrams of the heap 306 of FIG. 3a during a garbage collection process in accordance with a preferred embodiment of the present invention. In FIG. 3b the heap memory 306 is illustrated as having stored data at the shaded and hatched parts. Data stored in the heap 306 can be active or inactive. Active data is data that is in use by the software application 302, such as data that is referenced, reachable or held by the software application. Inactive data is data that is no longer in use by the software application, such as data that is no longer referenced, reachable or held. Data can become inactive due to dereferencing of object or memory pointers or by active or passive discarding of data in the heap. Four pieces of stored data are indicated as being active in the arrangement of FIG. 3b, and these are shaded using a cross-hatch.

FIG. 3c illustrates the heap memory 306 of FIG. 3b during a first part of a garbage collection process in accordance with a preferred embodiment of the present invention. Initially, the memory manager 304 supplies a second unit of memory as survivor space 308. The size of the survivor space 308 is configurable. Preferably, the survivor space has a size that is in the region of 20% of the size of the heap memory 306. Alternatively, the survivor space is fixed to a predetermined size or a size that is determined by a learning process to correspond to an appropriate size for garbage collecting of the heap. In practice, the size of the survivor space 308 is preferably substantially the same as or greater than the aggregated size of all active data in the heap 306. The garbage collector identifies the active data items in the heap 306 and copies the active data items to the survivor space 308. Preferably the garbage collector copies the active data to contiguous locations in the survivor space 308 to compact the active data (i.e. to prevent fragmentation of the memory during the copy operation).

FIG. 3d illustrates the heap memory 306 of FIG. 3b during a second part of a garbage collection process in accordance with a preferred embodiment of the present invention. Once the active data is copied to the survivor space 308, all active data in the heap 306 is indicated as being inactive. In this way, the entire heap 306 is made effectively devoid of data (empty). This is represented in FIG. 3d by the use of hashed shading to indicate all data stored in the heap 306 is inactive.

Subsequently, a portion 312 of the heap 306 is mapped to be logically contiguous with the survivor space 308 to define a new allocation space as heap 306'. The mapping of the portion 312 can be achieved by changing logical addresses of storage locations of the portion 312 of the heap 306 to run logically contiguous to the survivor space 308, as is well known by those skilled in the art. For example, a portion 312 of the heap 306 starting at address $U_{low}$ and having a size $U_{size}$ can be mapped to run logically contiguous to a survivor space starting at address $S_{low}$ and having a size $S_{size}$ by mapping the logical address of the unallocated portion as $U_{low}=S_{low}+S_{size}$. The portion 312 can be any portion of the heap 306 (since all data in the heap is now indicated to be inactive, the memory of the heap 306 is effectively empty). The portion 312 of the heap is dimensioned such that, when it is combined with the survivor space 308 to form the new allocation space as heap 306', a size of the heap 306' is equivalent to a size of the heap 306. Thus, $U_{size}+S_{size}=A_{size}$. In this way, a remaining portion of the heap 306 is defined—being that portion of the heap 306 not mapped to form part of the new heap 306'—having a size equivalent to that of the survivor space 308.

The new allocation space defined by heap 306' is subsequently available to the software application 302 for the storage of data. There is no distinction between a survivor portion 308 of the new heap 306' and the portion 312 mapped from heap 306 and the whole heap 306' is available as the allocation space for the software application.

Figure 4A:
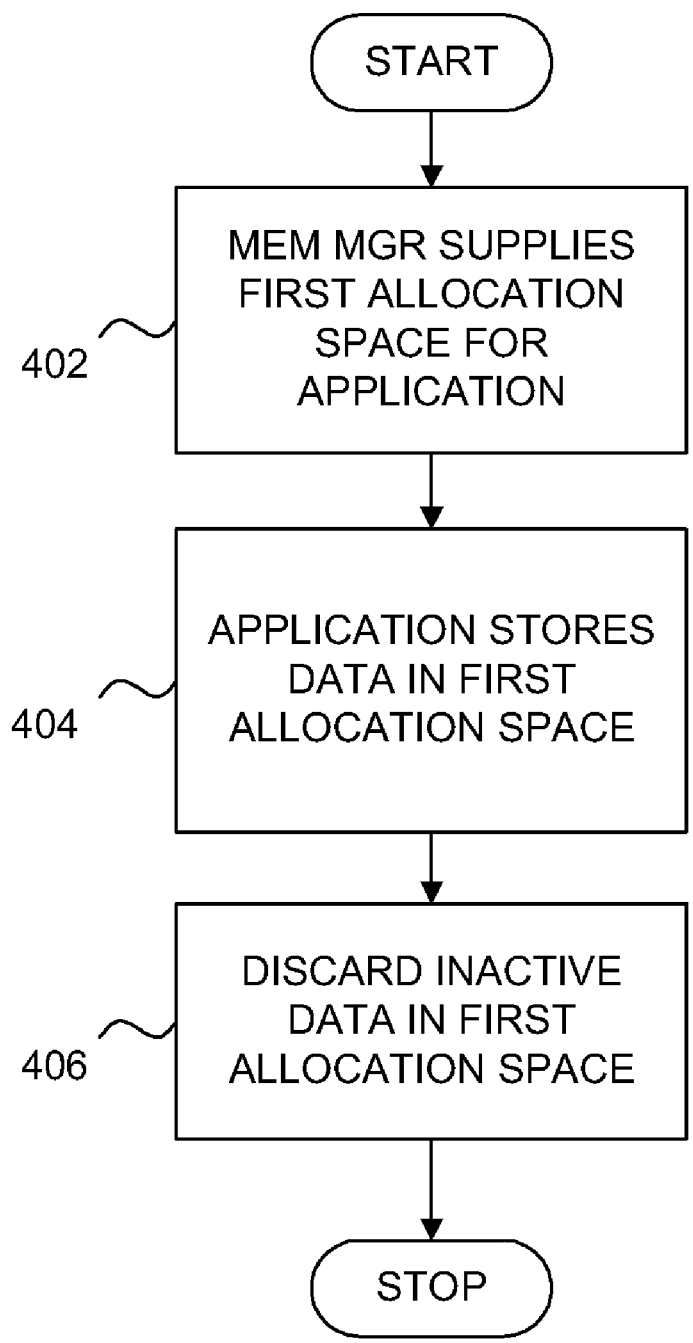
FIG. 4a is a flowchart of a method of memory management in accordance with a preferred embodiment of the present invention.

FIG. 4a is a flowchart of a method of memory management in accordance with a preferred embodiment of the present invention. Initially, at step 402, the memory manager 304 supplies a first allocation space to the software application 302 as a memory heap 306. At step 404 the application stores data in the heap 306. Finally, at step 406, a garbage collection process discards inactive data in the heap 306.

Figure 4B:
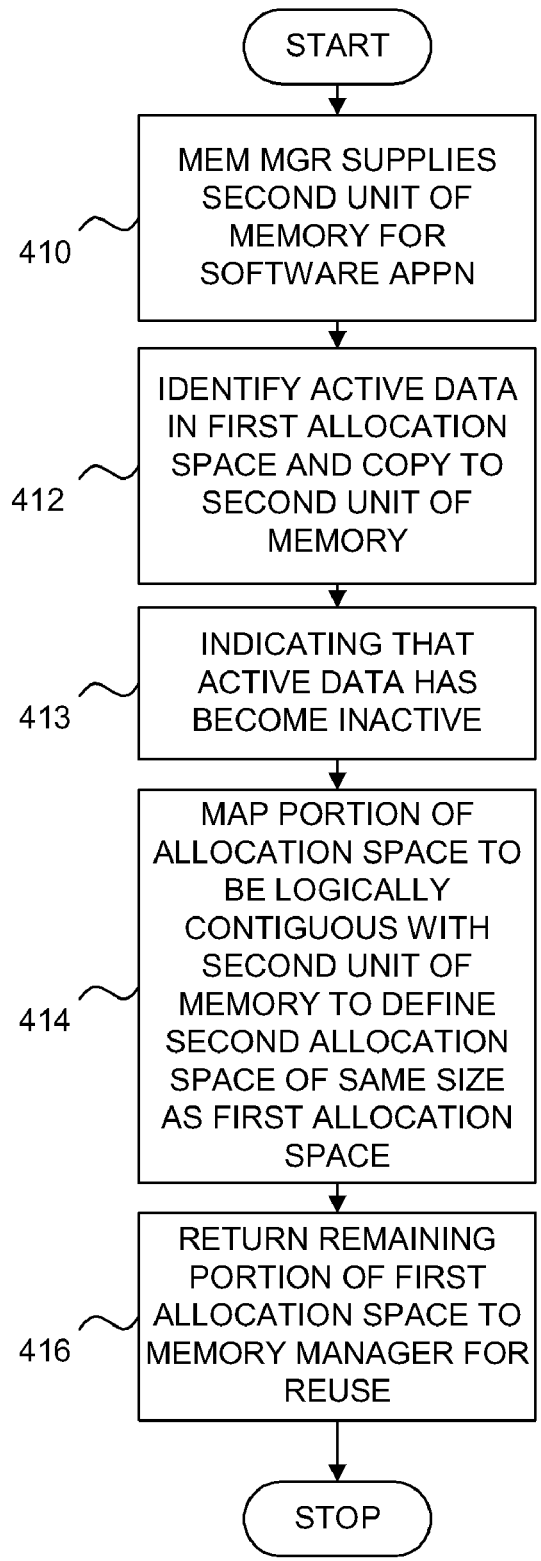
FIG. 4b is a flowchart of the step of discarding inactive data of FIG. 4a in accordance with a preferred embodiment of the present invention.

FIG. 4b is a flowchart of step 406 of discarding inactive data of FIG. 4a in accordance with a preferred embodiment of the present invention. Initially, at step 410, the memory manager 304 supplies a second unit of memory as survivor space 308 for the software application 302. At step 412 a garbage collection process identifies active data stored in the allocated portion 310 of the heap 306 and copies the identified active data to the survivor space 308. At step 413 the method indicates that all active data in the heap 306 as inactive, to indicate that the heap 306 is essentially now empty (devoid of active data) since all active data now exists in the survivor space 308. At step 414 the portion 312 of the heap 306 is mapped to be logically contiguous with the survivor space 308 to define a new allocation space as heap 306'. The portion 312 is selected to be such as to define the new heap 306' as having a size equivalent to a size of heap 306. Finally, at step 416, the remaining portion of the heap 306 that is not included in the new heap 306' is released for reuse by the memory manager 304.

Figure 5:
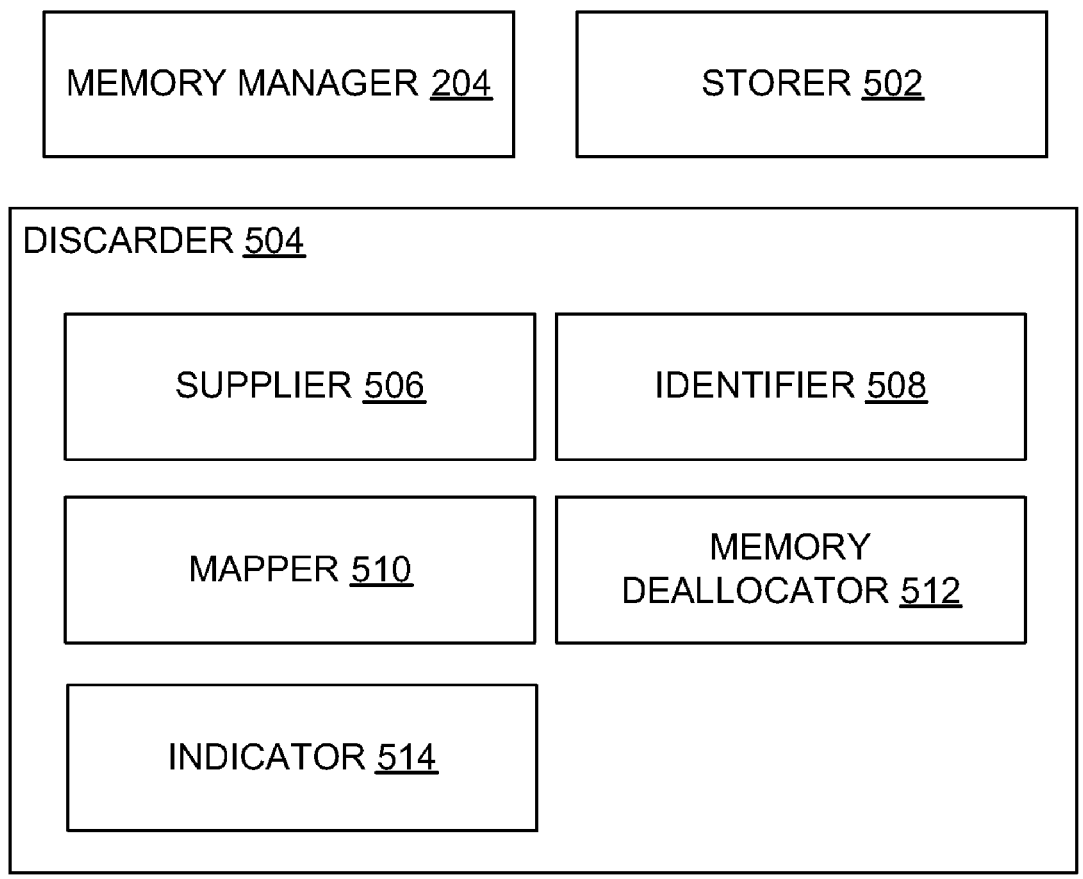
FIG. 5 is a schematic diagram of components of an apparatus in accordance with a preferred embodiment of the present invention.

FIG. 5 is a schematic diagram of components of an apparatus in accordance with a preferred embodiment of the present invention. The apparatus includes a memory manager 204 (as described above) and suitable for supplying a first unit of memory as a memory heap for a software application. Further included is a storer component 502 for storing data in the memory heap of the software application, thereby defining an allocated portion of the heap. Further included is a discarder 504, such as a garbage collection component, for discarding inactive data in the allocated portion. The discarder 504 includes a supplier component 506 for supplying a second unit of memory as a survivor memory for the software application. The discarder 504 further includes an identifier for identifying active data in the heap and copying the active data to the survivor memory. The discarder 504 further including a mapper component 510 for mapping unallocated portions of the heap to be logically contiguous with the survivor space, and a memory deallocator component 512 for returning the allocated portion to the memory manager 204 as a unit of memory suitable for reuse. The discarder 504 also includes an indicator 514 for indicating that all data in heap 306 is inactive following a copy of active data to survivor space 308.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A garbage collection method of memory management for a software application in execution in a computer system, the method comprising the steps of:
   supplying a first unit of heap memory having a predetermined size and without survivor memory as a first allocation space for the software application;
   storing data in the first allocation space; and
   discarding inactive data in the first allocation space in response to garbage collection of the heap memory by the steps of:
   a) supplying a second unit of memory separate from the heap memory for the software application as survivor memory;
   b) identifying active data in the first allocation space and copying said active data to the second unit of memory, the active data including at least data that is in use by the software application;
   c) indicating, in the first allocation space, that the active data has become inactive;
   d) mapping a portion of the first allocation space to be logically contiguous with the second unit of memory to define a second allocation space for the software application whereby the second allocation space has a size that is equivalent to the predetermined size; and
   e) returning a remaining portion of the first allocation as a unit of memory suitable for reuse.

2. The method of claim 1 wherein the second unit of memory is characterised by being of a size that is at least the same as an aggregated size of the active data in the first allocation space.

3. The method of claim 1 wherein the heap memory is a nursery heap.

4. A garbage collection apparatus for managing memory for a software application in execution in a computer system, the apparatus comprising:
   a memory of the computer system having a memory manager executing thereon for supplying a first unit of heap memory having a predetermined size and without survivor memory as a first allocation space for the software application;
   a storer for the software application to store data in the first allocation space; and
   a discarder for discarding in response to garbage collection of the heap memory inactive data in the first allocation space by the steps of:
   a) a supplier for the memory manager to supply a second unit of memory separate from the heap memory for the software application as survivor memory;
   b) an identifier for identifying active data in the first allocation space and copying said active data to the second unit of memory, the active data including at least data that is in use by the software application;
   c) an indicator for indicating, in the first allocation space, that the active data has become inactive;
   d) a mapper for mapping a portion of the first allocation space to be logically contiguous with the second unit of memory to define a second allocation space for the software application whereby the second allocation space has a size that is equivalent to the predetermined size; and
   e) a memory deallocator for returning a remaining portion of the first allocation to the memory manager as a unit of memory suitable for reuse.

5. The apparatus of claim 4 wherein the second unit of memory is characterised by being of a size that is at least the same as an aggregated size of the active data in the first allocation space.

6. The apparatus of claim 4 wherein the memory manager is a kernel memory manager in an operating system of the computer system.

7. The apparatus of claim 4 wherein the is a nursery heap.

8. An apparatus comprising:
   a central processing unit;
   a memory subsystem;
   an input/output subsystem;
   and a bus subsystem interconnecting the central processing unit, the memory subsystem, the input/output subsystem; and an apparatus comprising:
   a memory manager for supplying a first unit of heap memory having a predetermined size and without survivor memory as a first allocation space for the software application;
   a storer for the software application to store data in the first allocation space; and
   a discarder for discarding in response to garbage collection of the heap memory inactive data in the first allocation space by the steps of:
   a) a supplier for the memory manager to supply a second unit of memory separate from the heap memory for the software application as survivor memory;
   b) an identifier for identifying active data in the first allocation space and copying said active data to the second unit of memory, the active data including at least data that is in use by the software application;
   c) an indicator for indicating, in the first allocation space, that the active data has become inactive;
   d) a mapper for mapping a portion of the first allocation space to be logically contiguous with the second unit of memory to define a second allocation space for the software application whereby the second allocation space has a size that is equivalent to the predetermined size; and
   e) a memory deallocator for returning a remaining portion of the first allocation to the memory manager as a unit of memory suitable for reuse.

9. A computer readable storage medium having a computer program code loaded therein and executed thereon, cause the computer to perform the steps of a method of memory management for a software application in execution in a computer system, the method comprising:

supplying a first unit of heap memory having a predetermined size and without survivor memory as a first allocation space for the software application in order to store data from a software application in the first allocation space; and, discarding inactive data in the first allocation space in response to garbage collection of the heap memory by the steps of:

a) supplying a second unit of memory separate from the heap memory for the software application as survivor memory;

b) identifying active data in the first allocation space and copying said active data to the second unit of memory, the active data including at least data that is in use by the software application;

c) indicating, in the first allocation space, that the active data has become inactive;

d) mapping a portion of the first allocation space to be logically contiguous with the second unit of memory to define a second allocation space for the software application whereby the second allocation space has a size that is equivalent to the predetermined size; and e) returning a remaining portion of the first allocation as a unit of memory suitable for reuse.

* * * * *